Patent info:
- United States Patent [19] — Durairaj et al.
- [11] Patent Number: 4,889,891
- [45] Date of Patent: Dec. 26, 1989

[54] NOVEL RUBBER COMPOUNDING RESORCINOLIC RESINS

[75] Inventors: Bojayan Durairaj; Alex Peterson, Jr.; Gideon Salee, all of Pittsburgh, Pa.

[73] Assignee: Indspec Chemical Corporation, Pittsburgh, Pa.

[21] Appl. No.: 238,322

[22] Filed: Aug. 30, 1988

[51] Int. Cl.$^4$ ............................................. C08L 61/00
[52] U.S. Cl. ..................................... 525/139; 156/335; 156/338; 525/134; 525/140
[58] Field of Search ...................... 525/139, 134, 140; 156/335

[56] References Cited

U.S. PATENT DOCUMENTS 3,538,052 11/1970 Higginbottom ................ 525/139 X

Primary Examiner—Theodore E. Pertilla
Attorney, Agent, or Firm—Herbert J. Zeh, Jr.; Daniel J. Long; Arnold B. Silverman

[57] ABSTRACT

Rubber compounding novalak type resins are prepared by reacting (A) an alkyl substituted resorcinol or phenol prepared by reacting at least one of the compound of the formula

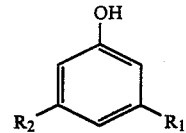

wherein $R_1$ and $R_2$ may be the same or different radicals selected from the group consisting of —H, —OH, —NH$_2$ and an alkyl of 1 to about 20 carbon atoms with a mono or polyunsaturated hydrocarbon selected from the group consisting of butene, diisobutylene, piperylene, dipentene, dicyclopentadiene, cyclopentadiene, isoprene, butadiene, pinene, styrene and divinylbenzene in the presence of an acid catalyst, wit (B) an aldehyde selected from the group consisting of formaldehyde, paraformaldehyde, acetaldehyde, propionaldehyde, butyraldehyde, crotonaldehyde, benzaldehyde and furfural.

4 Claims, No Drawings

NOVEL RUBBER COMPOUNDING RESORCINOLIC RESINS

BACKGROUND OF THE INVENTION

1. Field of the Invention

The present invention relates to alkyl substituted resorcinolic novolak resins which are used with curing agents in rubber to give improved mechanical properties and tire cord to rubber adhesion.

2. Brief Description of the Prior Art

Resorcinol and resorcinol-formaldehyde resins have been used in the rubber industry as reinforcing and bonding agents in the rubber compounds. These resorcinolic compounds and resins are unique materials for rubber compounding since they act as thermosetting or vulcanizing plasticizers. They are very efficient plasticizers for rubber during the processing operations. This allows easier processing, higher loading and excellent extrusions for the rubber compounds.

The thermosetting properties of resorcinol and resorcinol based resins on curing allow the vulcanizate to show increase in hardness, abrasion resistance, aging resistance, solvent and oil resistance and stiffness, and aldo give much improved finishes to the cured rubber stock. This combination of plasticizing and reinforcing action is rare for a single material. In addition, these resorcinolic resins may act as antioxidants in the rubber compound.

Though resorcinol and resorcinol-formaldehyde resins provide good mechanical and adhesion properties, fuming and hygroscopicity of these compounds present problems in rubber compounding and handling. The hygroscopic behavior of resorcinol and resorcinol-formaldehyde resins can be reduced by the inclusion of a hydrophobic aliphatic hydrocarbon molecule. This can be achieved by alkylating resorcinol or resorcinol-formadehyde resins with unsaturated hydrocarbons in the presence of an acid catalyst. The volatility of the resorcinol derivative is lower than that of resorcinol due to the presence of alkyl substituents.

The properties of rubber compounds containing resins also depend on their miscibility. Significant miscibility is seen with alkylphenol-formaldehyde resins in general purpose rubbers. Therefore, a significant increase in the tack of rubber compounds based on isoprene, butadiene and styrene-butadiene is expected to take place with alkylated resorcinolic resins in which the alkyl group contains at least four carbon atoms.

The alkylation reaction of phenols can be carried out with an olefin or alcohol using Friedel-Crafts or an acid catalyst. The alkylated phenols have been used extensively as antioxidants in the rubber compound formulation. Similarly, alkyl substituted resorcinolic compounds have been successfully prepared using tert-butyl alcohol, isoamylene, diisobutylene in the presence of an acid catalyst.

Alkyl substituted resorcinolic novalak type resins could be made without isolating the alkyl resorcinol. This can be achieved by first reacting resorcinol with an unsaturated hydrocarbon, like piperylene, dicyclopentadiene, dipentene and divinyl benzene using an acid catalyst. Then an aldehyde such as formaldehyde can be added into the above reaction mixture to produce the novalak type resins.

It is, therefore, an object of the present invention to provide alkyl substituted novalak resins that are capable of crosslinking with curing agents in the rubber to give improved mechanical and cord to rubber adhesion properties.

SUMMARY OF THE INVENTION

According to the present invention, it has been discovered that an alkyl substituted resorcinolic novalak type resin may be prepared by reacting (A) an alkyl substituted resorcinol or phenol prepared by reacting at least one of the compounds of the formula

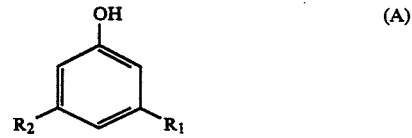

wherein $R_1$ and $R_2$ may be the same or different radicals selected from the group consisting of —H, —OH, —NH$_2$, and an alkyl of 1 to 20 carbon atoms with a mono or polyunsaturated hydrocarbon selected from the group consisting of butene, diisobutylene, piperylene, dipentene, cyclopentadiene, dicyclopentadiene, isoprene, butadiene, pinene, styrene and divinyl benzene in the presence of an acid catalyst, with (B) an aldehyde selected from the group consisting of formaldehyde, paraformaldehyde, acetaldehyde, propionaldehyde, butyraldehyde, crotonaldehyde, benzaldehyde and furfural.

The preferred embodiment of the process of this invention is to react resorcinol with a mono or polyunsaturated hydrocarbon at a molar ratio of 1 mole of resorcinol to 0.1 to 2.0 moles of an unsaturated hydrocarbon in the presence of an acid catalyst at 100°–150° C. Thereafter, methylformcel is added at a molar ratio of 0.1 to 1.0 moles and reacted at 60°–100° C., after which the reaction product is dehydrated.

Further, according to the invention, the alkyl substituted resorcinolic novalak resins showing improved tensile and dynamic mechanical properties of the cured rubber compound over the conventional resorcinol-formaldehyde resins.

DESCRIPTION OF THE PREFERRED EMBODIMENT

Achievements of the objects in accordance with this invention, as embodied and broadly described, is related to an improved vulcanizable rubber composition comprising rubber, a filler material, vulcanizing agent, methylene donor and an alkyl substituted resorcinolic novalak type resin of this invention.

The following detailed description is exemplary and explanatory and it is to be understood that its scope is not limited to the embodiments and restrictions of the invention.

The alkyl substituted resorcinol novalak resins used according to the present invention are advantageously prepared by reacting (A) an alkyl substituted resorcinol prepared by reacting at least one of the phenolic compounds of the formula

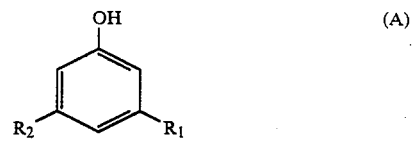

wherein $R_1$ and $R_2$ may be the same or different radicals selected from the group consisting of —H, —OH, —NH$_2$ and an alkyl of 1 to 20 carbon atoms, with a mono or polyunsaturated hydrocarbon selected from the group consisting of butene, diisobutylene, piperylene, dipentene, dicyclopentadiene, isoprene, butadiene, pinene, styrene and divinyl benzene in the presence of an acid catalyst, with (B) an aldehyde selected from the group consisting of formaldehyde, acetaldehyde, propionaldehyde, butyraldehyde, crotonaldehyde, benzaldehyde and furfural.

The compound of the formula (A) includes resorcinol, catechol, hydroquinone, m-aminophenol, m-cresol, 3,5-dimethyl phenol and cashew-nut shell liquid. The molar ratio of resorcinol to unsaturated hydrocarbon is in the range of 1 mole of resorcinol to 0.1 to 2.0 moles of an unsaturated hydrocarbon. Alkylation reaction of resorcinol and unsaturated hydrocarbon can be carried out in the presence or absence of any additional solvents. Suitable examples of the organic solvent are benzene, toluene, xylene, ethylbenzene, cumene, mesitylene, or the like.

Acids may be used as catalysts for the alkylation of resorcinol with unsaturated hydrocarbons. The following may thus, of example, be used; inorganic acids, e.g. hydrochloric, sulfuric, phosphoric and phosphorus acids; sulfonic acids, e.g. benzene mono-, di- and trisulfonic acids, toluene sulfonic acids and alkane sulfonic acids. The amount of catalyst that may be employed for the alkylation is in the range of 0.01 to 10 parts per 100 parts of resorcinol. The reaction temperature may be preferably in the range of 50° to 180° C.

After the reaction of resorcinol with an unsaturated hydrocarbon, in the absence of any solvent, an appropriate organic solvent may be added to ensure the smooth progress of the reaction. The function of such solvents used is to give better solubility for the alkylated resorcinol and resin. Examples of such solvents are methyl alcohol, ethyl alcohol, n-propyl alcohol, isopropyl alcohol, butanol, acetone, tetrahydrofuran or the like.

An aldehyde may be then added slowly into the reaction product of resorcinol and the unsaturated hydrocarbon at 80°-90° C. and the reaction continued for 1 to 10 hours at this temperature before dehydration. Suitable examples of an aldehyde that may be used include aqueous formaldehyde (37%), paraformaldehyde, methylformcel, butylformcel, acetaldehyde, propionaldehyde, butyraldehyde, crotonaldehyde, benzaldehyde, furfural or the like. The amount of an aldehyde may be in the range of 0.1 to 0.8 mole per mole of resorcinol used. Alkyl substituted resorcinolic novalak resins prepared according to this invention are generally brittle resins and have softening points in the range of 40°-150° C.

According to this invention the alkyl substituted resorcinolic resins are preferably incorporated in the elastomeric compositions in an amount of from 1 to 50% by weight, preferably from 1 to 15% by weight, calculated on the elastomer. However, if required, larger quantities can be used.

The expression "rubber" used herein refers to natural and synthetic rubber. Representative synthetic rubbery polymers include the butadiene polymers. Butadiene polymers include those polymers having rubber-like properties which are prepared by polymerizing butadiene alone or with one or more other polymerizable ethylenically unsaturated compounds, such as styrene, methylstyrene, methyl isopropenyl ketone and acrylonitrile. The butadiene being present in the mixture preferably to the extent of at least 40% of the total polymerizable material. Other synthetic rubbers include the neoprene rubbers. Isorutylene rubber (butyl) and ethylene-propylene rubber (EPDM) may also be employed.

The rubber employed will contain various additives such as those needed to effect the vulcanization. Examples of these materials include sulfur, carbon black, antioxidants, zinc oxide, accelerators, silica, processing and softening oils and the like. The components are preferably employed in an amount varying from about 0.1 part to 100 parts per 100 parts of rubber.

Methylene donors in the vulcanizable rubber compositions, according to the present invention, are capable of generating formaldehyde by heating during the vulcanization include various compounds disclosed in the specification of U.S. Pat. No. 3,751,331. Suitable examples of these methylene donors are hexamethylenetetramine, di- to hexa-methylol melamines or completely or partially etherified or esterified derivatives thereof, oxazolidine derivatives or the like. The weight ratio of the methylene donor to resorcinolic novalak resins can range from 1:10 to 10:1.

A preferred method of making the rubber vulcanizate is to mix the rubber, carbon black, activators, antidegradants and novalak resin in a Banbury mixer at a temperature of about 150° C. The resulting masterbatch is then compounded on a standard 2-roll rubber mill with sulfur, accelerators and methylene donor. the vulcanization composition is then shaped and then cured.

The following examples are given for the purpose of illustrating this invention and not intended as limitations thereof.

EXAMPLE 1

Into a 1-liter reaction kettle equipped with a stirrer, thermometer, reflux condenser and an addition funnel, 220.2 g of resorcinol (2.0 moles) were charged and heated to 120° C. p-Toluene sulfonic acid (2.0 g) was added at 120° C. followed by the slow addition of 40.0 g of piperylene (65-70% active) for about 60 minutes. The temperature of the reaction mixture was maintained between 135°-145° C. during the piperylene addition. After the piperylene addition has been completed, 100 g of methanol were added first and then 54.8 g of methylformcel (55% W/V, 1.0 mole) were slowly added into the piperylene-resorcinol reaction product for about 30 minutes at 70°-80° C. The reaction mixture was refluxed for 3 hours more and the solvent was removed under reduced pressure to give the Resin A having a softening point of 99.5° C.

EXAMPLE 2

Into a 1-liter reaction kettle equipped with a stirrer, thermometer, reflux condenser and an addition funnel, 220.2 g. of resorcinol (2.0 moles) were charged and heated to 115° C. p-Toluenesulfonic acid (2.0 g.) was added at 115° C. followed by the slow addition of 68.1 g. of dipentene (87.4% active) for about 45 minutes. The temperature of the reaction mixture was maintained between 135°-140° C. during the dipentene addition. After the dipentene addition was completed, 100.0 g. of methanol were added first and then 54.8 g. of methylformcel (55% W/W, 1.0 mole) were added slowly into the dipentene-resorcinol reaction product for about 30 minutes at 80°-85° C. The reaction mixture was refluxed for 2 hours more and the solvent was removed under reduced pressure to give the Resin B having a softening point of 109° C.

EXAMPLE 3

Into a 1-liter reaction kettle equipped with a stirrer, thermometer, reflux condenser and an addition funnel, 220.2 g. of resorcinol (2.0 moles) were charged and heated to 115° C. p-Toluene-sulfonic acid (2.0 g.) was added at 115° C. followed by the slow addition of 33.1 g. of dicyclopentadiene for about 30 minutes. The temperature of the reaction mixture was maintained between 135°-140° C. during the dicyclopentadiene addition. After the dicyclopentadiene addition was completed, 100.0 g. of methanol were added first and then 54.8 g. of methylformcel (55% W/V, 1.0 mole) were added slowly into the dipentene-resorcinol reaction product for about 30 minutes at 80°-85° C. The reaction mixture was refluxed again for 2 hours more and the solvent was removed under reduced pressure to give the Resin C having a softening point of 124.5° C.

EXAMPLE 4

Into a 2-liter reaction kettle equipped with a stirrer, thermometer, reflux condenser and an addition funnel, 495.6 g. of resorcinol (4.5 moles) were charged and heated to 115° C. p-Toluenesulfonic acid (1.6 g.) was added at 115° C. followed by the slow addition of 390.3 g. of divinylbenzene (55% active; 3.0 moles) for about 2.0 hours. The temperature of the reaction mixture was maintained between 120°-130° C. during the divinylbenzene addition. After the divinylbenzene addition was completed, 260.0 g. of methanol were added first and then 49.2 g. of methylformcel (55% W/V, 0.9 mole) were added into the resorcinol-divinylbenzene reaction product for about 30 minutes at 80°-90° C. The reaction mixture was refluxed again for 2 hours more and the solvent was removed under reduced pressure to give the Resin D having a softening point of 93.5° C.

EXAMPLE 5

Into a 500 ml reaction kettle were charged 110 g of resorcinol (1.0 mole) and 48.6 g of 37% aqueous formaldehyde (0.6 mole) solution and refluxed for 5.0 hours. After the reflux period, water was distilled out at 135° C. under reduced pressure to give Resin E having a softening point of 103° C.

EXAMPLE 6

The black natural rubber compounds were prepared in three stages to test the adhesion and reinforcing effects of the resins prepared. The basic compound formulation is shown in Table I.

TABLE I

| Rubber Compound Used In Reinforcing and Adhesion Tests | |
| --- | --- |
| Masterbatch | Parts by weight |
| Natural Rubber SMRCV60 | 100.0 |
| HAF Black N-326 | 55.0 |
| Zinc Oxide | 8.0 |
| Stearic Acid | 1.2 |
| N—(1,3-Dimethylbutyl)-N'—Phenyl-p-Phenylenediamine | 2.0 |
| Polymerized 1,2-Dihydro-2,2,4-Trimethylquinoline | 1.0 |
| N—(Cyclohexylthio)Phthalimide | 0.2 |
| Resorcinolic Resin | 2.0 |
| Cobalt Naphthenate (12%) | 0.83 |
| Insoluble Sulfur (80%) | 4.69 |
| N—t-butyl-2-benzothiazolesulfenamide | 1.00 |

TABLE I-continued

| Rubber Compound Used In Reinforcing and Adhesion Tests | |
| --- | --- |
| Masterbatch | Parts by weight |
| Methylene Donor[1] | 3.08 |

[1]Hexamethoxymethylmelamine (65% HMMM)

In the first stage, the black masterbatch was mixed in a Size 3 Banbury mixer to a dump temperature of 143° C. and sheeted to a thickness of 10 mm. In the second stage, an appropriate amount of the black masterbatch for each compound was mixed with the required level of resorcinolic resin and cobalt compound on a two-roll lab mill at 118°-124° C. The compounds were sheeted and cooled. The sulfur, accelerator and appropriate amount of HMMM were added to the compound in the third stage, using the two-roll mill at 96°-102° C. The compounds were aged overnight in a constant temperature room at 23° C. and 50% relative humidity before testing.

Cure characteristics for each compound were determined with a Monsanto 100 Rheometer at 149° C.; 1° arc and 1.67 Hz according to ASTM D2084-81 method.

The rheometer cure data, adhesion data and dynamic mechanical data for the cured rubber samples are given in Table II.

TABLE II

| Rubber Compound Properties | | | |
| --- | --- | --- | --- |
| Property/Test | Control[1] | Resin A | Resin E |
| Rheometer cure (ASTM D-2084) | | | |
| MH, in-lb. | 49.9 | 66.2 | 57.9 |
| ML, in-lb. | 8.2 | 10.0 | 10.2 |
| ts 2, minutes | 5.2 | 3.1 | 3.2 |
| t' 90, minutes | 12.8 | 14.0 | 13.7 |
| Tensile (ASTM D-412) | | | |
| 300% Modulus (psi) | 2738 | 2789 | 2857 |
| Tensile Strength (psi) | 3882 | 3843 | 3741 |
| Ultimate Elongation (%) | 451 | 423 | 409 |
| Adhesion (ASTM D-2229) lbs. (% rubber coverage) 7 × 4 × 0.175 mm wire: 63.5% copper, 4.9 g./Kg plating | | | |
| Unaged | 233(70) | 333(90) | 289(90) |
| Shore A Hardness | 70 | 80 | 75 |
| Steam, 16 hours at 120° C. | 87(5) | 338(95) | 308(95) |
| Shore A Hardness | 69 | 79 | 73 |
| Humidity, 21 days, 85° C., 95% RH | 125(40) | 298(90) | 281(85) |
| Shore A Hardness | 77 | 85 | 82 |
| Dynamic Mechanical[2, 3] | | | |
| Unaged | | | |
| G' at 0.2% Strain, MPa | 15.57 | 37.07 | 28.14 |
| G" at 2.0% Strain, MPa | 19.36 | 41.27 | 33.57 |

[1]Cobalt only
[2]Cured to t' 90 at 150° C.
[3]Rheometrics Mechanical Spectrometer 800, 1.0 Hz, RT.

These data clearly demonstrate that the resins of this invention improve the mechanical properties of the cured rubber compound while maintaining adhesion properties comparable to the resorcinol-formaldehyde resin.

Although the invention has been described with some particularity, it is to be understood that the scope of the invention is defined by what is hereafter claimed.

What is claimed is:

1. A vulcanizable rubber composition comprising (I) a rubber component selected from at least one member of the group consisting of natural rubber, styrene butadiene copolymer rubber, polyisoprene rubber, polybutadiene rubber, acrylonitrile butadiene rubber and polychloroprene rubber, (II) a methylene donor compound which is capable of generating formaldehyde by heating and (III) a methylene acceptor prepared by reacting (A) an alkyl substituted resorcinol or phenol prepared by reacting at least one of the compound of the formula

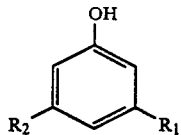

wherein $R_1$ and $R_2$ may be the same or different radicals selected from the group consisting of —H, —OH, —NH$_2$ and an alkyl of 1 to about 20 carbon atoms with a mono or polyunsaturated hydrocarbon selected from the group consisting of butene, diisobutylene, piperylene, dipentene, dicyclopentadiene, cyclopentadiene, isoprene, butadiene, pinene, styrene and divinylbenzene in the presence of an acid catalyst, with (B) an aldehyde selected from the group consisting of formaldehyde, paraformaldehyde, acetaldehyde, propionaldehyde, butyraldehyde, crotonaldehyde, benzaldehyde and furfural.

2. The composition of claim 1 wherein the methylene donor is selected from the group consisting of hexamethoxymethylmelamine and hexamethylenetetramine.

3. The composition of claim 1 wherein the concentration of methylene donor is 1 to about 15 parts per hundred parts of the rubber.

4. The composition of claim 1 wherein the concentration of methylene acceptor is from 1 to about 15 parts per hundred parts of the rubber.

* * * * *